Feb. 10, 1931. F. A. LOMONT 1,792,383
BRAKE
Filed March 13, 1929
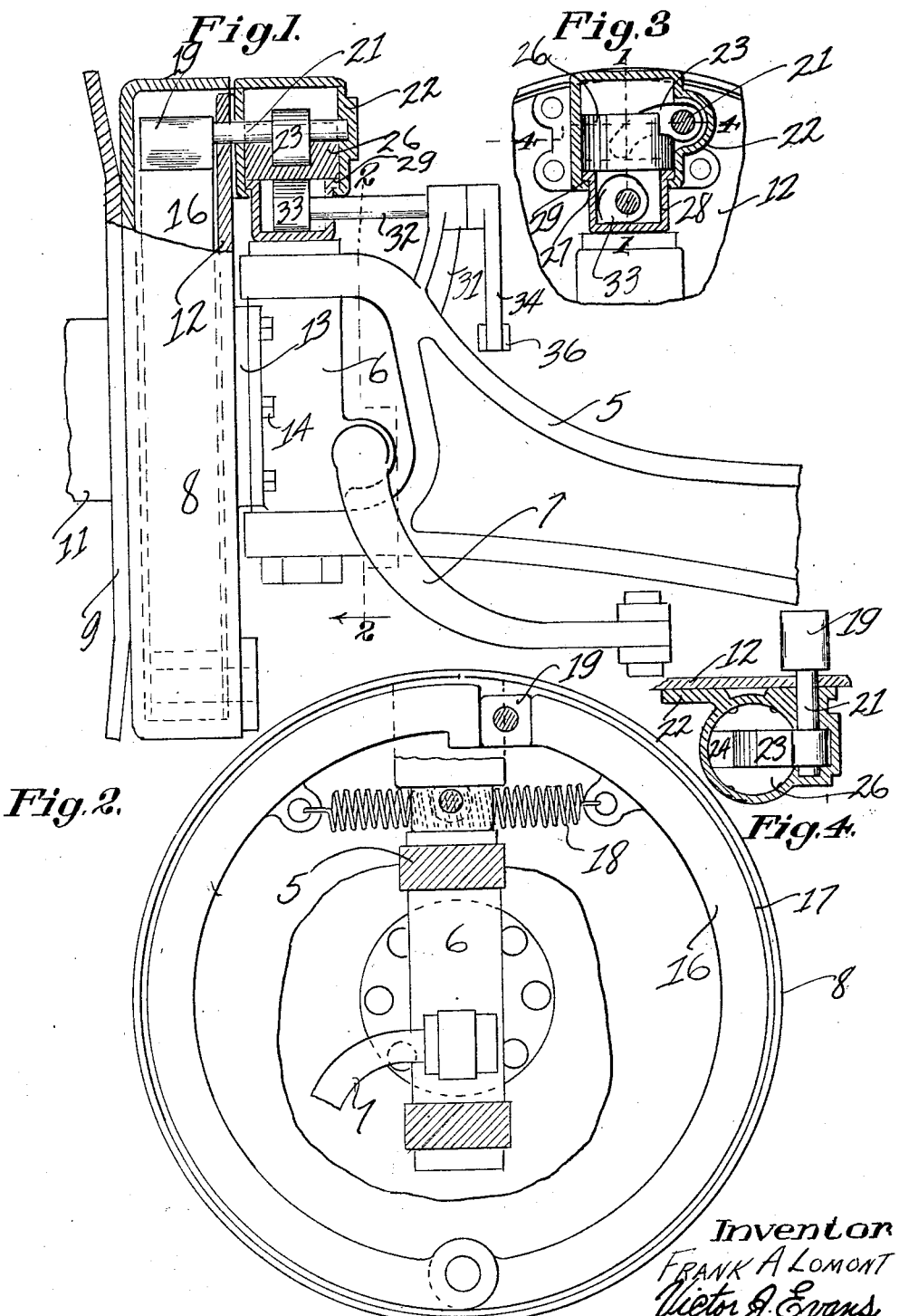
Inventor
FRANK A LOMONT
By Victor J. Evans
Attorney Patented Feb. 10, 1931

1,792,383

UNITED STATES PATENT OFFICE

FRANK A. LOMONT, OF SEBASTOPOL, CALIFORNIA

BRAKE

Application filed March 13, 1929. Serial No. 346,652.

This invention relates to improvements in brakes and has particular reference to means for transmitting power to the front wheel brakes of a motor vehicle.

The principal object of this invention is to provide means whereby the brake bands may be expanded in a pivoted wheel in counter distinction to the expansion of a brake band in a wheel which is held in rigid alignment of the axle.

Another object is to provide means whereby universal joints are eliminated.

Another object is to provide means whereby the braking action at all times will remain constant irrespective of the angle of the wheel with respect to the axle.

A further object is to provide a device of this character which is economical to manufacture.

Other objects and advantages will be apparent during the course of the following description.

In the accompanying drawings forming a part of this specification and in which like numerals are employed to designate like parts throughout the same, Figure 1 is a fragmentary detail view partly in cross section of a steering knuckle assembly showing my invention applied thereto, Figure 2 is a cross sectional view taken on the line 2—2 of Figure 1, certain parts being broken away and shown in cross section, Figure 3 is a fragmentary detail view showing my invention applied to the brake drum plate, and Figure 4 is a cross section taken on the line 4—4 of Figure 3.

In order to manipulate the brake band or shoe on a wheel which is pivoted with respect to the axle, it is necessary to provide means for accommodating the pivotal action between the wheel and the axle. This has been heretofore accomplished in various manners, either by employing a fluid connection or by using universal joints. Both of these means are subject to mechanical difficulties and it is to overcome these difficulties that I have produced my invention.

In the accompanying drawing wherein for the purpose of illustration is shown a preferred embodiment of my invention the numeral 5 designates the end of an axle such as the front axle of any motor vehicle. The numeral 6 designates the customary steering knuckle and the numeral 7 the usual steering arm. The parts thus far described form no part of my invention.

At 8 I have shown a brake drum which is secured to the wheel 9 which may be of the disc or artillery type, mounted upon the customary hub 11.

The numeral 12 designates a plate having a boss 13, bolted as at 14 to the steering knuckle 6. Within the drum 8 is positioned the ordinary brake shoe 16 having the usual lining 17. The customary contraction spring is shown at 18 which is fastened to the two halves of the brake shoe 16.

In order to expand this shoe, a cam member 19 is employed which is rotatable through the medium of a short shaft 21 journalled in a housing 22 secured to the plate 12. This housing 22 is positioned above the knuckle 6 and in alignment with its axis.

Secured to the shaft 21 is an arm 23 which has its nose extending into a slot 24 formed in a piston-like plunger 26. It is to be noted that the housing 22 has its lower portion provided with a bore 27 which bore is in axial alignment with the king pin of the steering knuckle 6. This permits rotary movement of a cup-shaped member 28 which is provided with a flange 29 which engages the housing 22.

An arm 31 formed upon the axle 5 serves to journal one end of a shaft 32, the opposite end of which shaft extends through the cup-shaped member 28 and has a cam 33 secured thereto. This cam lies beneath the plunger 26.

A crank arm 34 is connected to the usual brake rod 36 and serves to actuate or rock the shaft 32.

The result of this construction is that when the brake rod 36 is moved for the purpose of setting the brakes the movement is transmitted through the crank arm 34 to the shaft 32 which actuates the cam 33 which pushes upon the plunger 26 pushing upwardly upon the nose of the lever 23 thus rocking the shaft 21 and the cam 19 which causes the two halves of the brake shoe 16 to be expanded in the customary manner.

It is obvious that when the wheel is moved about its pivotal connection with the axle the cup-like member 28 will remain stationary while the members 22 will rotate thereabout so that at all times, the under surface of the plunger 26 is in position to be acted upon by the cam 33.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:—

1. In a device of the character described, the combination with a steering knuckle and an axle pivoted one to the other, a plate secured to said knuckle, a housing secured to said plate, a shaft extending through said plate and having one end positioned within said housing, a lever secured to said shaft, a movable plunger carried in said housing and adapted to engage said lever, a cup-like member rotatably mounted in said housing, said cup-like member being in axial alignment with the pivotal axis of said steering knuckle, and means carried within said cup-like member for exerting pressure against said plunger for the purpose described.

2. In a device of the character described, the combination with a steering knuckle and an axle pivoted one to the other, a plate secured to said knuckle, a housing secured to said plate, a shaft extending through said plate, and having one end positioned within said housing, a lever secured to said shaft, a movable plunger carried in said housing and adapted to engage said lever, a cup-like member being in axial alignment with the pivotal axis of said steering knuckle, means carried within said cup-like member for exerting pressure against said plunger, said means including a shaft rotatably supported on said axle and having a cam positioned within said cup shaped member and a lever at its opposite end whereby when said lever is actuated, said cam will function in the manner described.

In testimony whereof I affix my signature.

FRANK A. LOMONT.